United States Patent [19]

Yoshinaka et al.

[11] Patent Number: 4,937,428
[45] Date of Patent: Jun. 26, 1990

[54] CONSUMABLE ELECTRODE TYPE ARC WELDING CONTACT TIP

[75] Inventors: Minoru Yoshinaka, Higashiosaka; chuji Kiuchi; Harumi Tokushige, both of Kaga; Yoshikatsu Sakano, Nomi; Yukitoshi Yamada, Osaka; Katsumi Handa, Toyonaka, all of Japan

[73] Assignee: Matsushita Electric Industrial Co., Ltd., Osaka, Japan

[21] Appl. No.: 275,518

[22] Filed: Nov. 23, 1988

[30] Foreign Application Priority Data

Jan. 14, 1988 [JP] Japan ................................ 63-5820
Jan. 14, 1988 [JP] Japan ................................ 63-5821
Jan. 14, 1988 [JP] Japan ................................ 63-5868

[51] Int. Cl.⁵ .............................................. B23K 9/26
[52] U.S. Cl. ............................................. 219/137.52
[58] Field of Search ........... 219/136, 137, 52, 137.31, 219/137.61

[56] References Cited

U.S. PATENT DOCUMENTS 3,470,349 9/1969 Sievers .......................... 219/136
4,450,341 5/1984 Dietrick et al. ............... 219/137.52
4,560,858 12/1985 Manning ....................... 219/137.52

FOREIGN PATENT DOCUMENTS 0080803 6/1983 European Pat. Off. .
2565141 12/1985 France .
133979 8/1984 Japan ............................ 219/137.52
310756 11/1971 U.S.S.R. ........................... 219/136

Primary Examiner—Philip H. Leung
Assistant Examiner—Geoffrey S. Evans
Attorney, Agent, or Firm—Stevens, Davis, Miller & Mosher

[57] ABSTRACT

A welding contact tip for use on a consumable electrode type welder has a core part having a bore for guiding a consumable electrode and capable of supplying welding current to the consumable electrode, and a main part which embraces and supports the core part. The core part is made of a heat- and wear-resistant conductive metallic material such as a phosphor bronze alloy, while the main part is made from a less-expensive material such as copper, a copper alloy, aluminum or an aluminum alloy.

7 Claims, 3 Drawing Sheets

CONSUMABLE ELECTRODE TYPE ARC WELDING CONTACT TIP

BACKGROUND OF THE INVENTION

The present invention relates to a welding contact tip for use on a welding torch of a consumable electrode type arc-welder.

A known welding contact tip (simply referred to as "tip" hereinafter) will be described with reference to FIG. 1. The tip 5 has a central wire passage bore 3 through which a consumable electrode (simply referred to as "welding wire" hereinafter) is fed to a welding region. In addition, the tip supplies welding electric current to the wire. Thus, the tip has a double role: Namely a role of a guide for guiding the wire and a role of electric power feeder.

In order to supply welding current to the wire, the tip 5 is held in contact with the wire. During welding, a high temperature is developed on the portion of the tip 5 contacting the wire. In consequence, the wall of the wire passage bore 3 is so heavily worn that the tip is soon disabled to conduct the double role, i.e., the tip fails to guide the wire and to supply welding current.

Hitherto, therefore, expensive chromium-copper alloys having superior wear resistance at a high temperature have been used as the material of the tips.

SUMMARY OF THE INVENTION

Accordingly, an object of the present invention is to provide a highly durable and inexpensive welding contact tip which is easy to manufacture.

According to the invention, there is provided a welding contact tip which is composed of two parts: namely, a core part which functions as the wire guide and as the welding current feeder and a main part which is in support of the core part. The core part is made of a hard conductive metallic material which has a high rigidity and high level of resistance both to heat and wear. Examples of suitably usable material are a chromium-copper alloy, having a chromium content which preferably ranges between 0.1% and 5%, and a phosphor bronze having a phosphorus content which preferably ranges between 0.005% and 3%. On the other hand, the main part is made of a less-expensive metallic material such as copper, a copper alloy, aluminum or an aluminum alloy.

Since the main part made of a less-expensive material provides a much greater portion of the tip than the core part, the production cost of the welding contact tip can remarkably be reduced as compared with known tips.

The core part may be formed by forging. The core part fabricated by forging exhibits an improved hardness so as to ensure a longer life of the tip. The core part may have the form of a coil. In such cases, the efficiency of the work can remarkably be improved because the boring by drilling can be dispensed with.

Thus, the welding contact tip according to the present invention offers the following remarkable advantages over the known tips.

(1) The material cost can remarkably be reduced because only the core part which is much smaller than the main part is made from an expensive hard conductive metal, while the main part is made from a less expensive material such as copper, a copper alloy, aluminum or an aluminum alloy.

(2) The main part, which is made of a material such as copper, aluminum or the like, exhibits a high workability so that various types of mechanical processing such as shaping of outer configuration of the tip can be greatly facilitated while affording longer life of tools such as a single point tool and a rolling roller which are used in the mechanical processing.

(3) The core part, when formed as a coil, eliminates the necessity of drilling which otherwise must be conducted on the hard material of the core part such as chromium copper alloy. This eliminates problems such as breakdown of the drill and other tools, so that the maintenance of the production system is facilitated and the efficiency of working for the production of the tip is improved.

(4) When the core part is formed by forging, the core part exhibits higher hardness due to work-hardening, so that the tip can have an extended use. The use of forging also can eliminate the necessity for drilling which has to be conducted on the hard material such as chromium copper alloy. In consequence, troubles such as breakage of drills are avoided to facilitate the maintenance of the production system, thus contributing to an improvement in the efficiency of the working.

DESCRIPTION OF THE PREFERRED EMBODIMENTS

Figure 1:
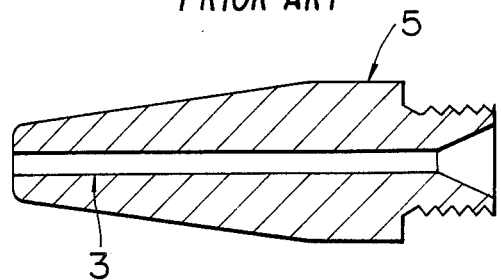
FIG. 1 is a sectional view of a known welding contact tip.
Figure 2A:
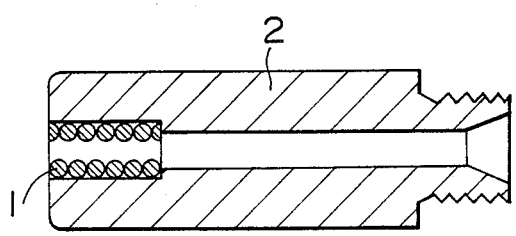
FIGS. 2A to 2C, 3A, 3B, 4A and 4B are sectional views of welding contact tips embodying the present invention.
Figure 2A:
Figure 2B:
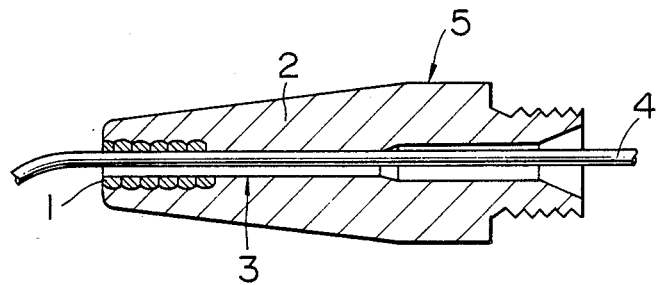
Figure 2C:
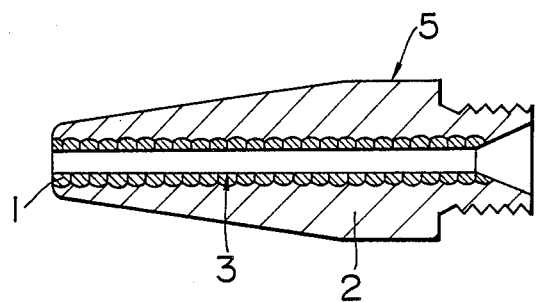

FIGS. 2A to 2C show an embodiment of the welding contact tip in accordance with the present invention. Referring first to FIG. 2A, the tip has a core part 1 and a main part 2. The core part 1 has the form of a coil of a wire having a diameter of 0.1 to 2 mm, preferably 0.5 to 1.2 mm. A wire diameter not greater than 0.1 mm cannot produce any appreciable effect of the provision of the core part 1, while a wire diameter exceeding 2 mm makes the coil winding operation difficult with the result that the production cost is raised undesirably. Preferably, the pitch of winding of the coil in terms of ratio pitch wire diameter ranges between 1 (adjacent turns of coil closely contact each other) and 2 (wire is wound coarsely). When the value of this ratio exceeds 2, the coil tends to move undesirably with the result that the supply of the welding current to the welding wire 4 becomes unstable to cause a fluctuation at the level of the welding current. It is not essential that the pitch of the coil is constant. For instance, it is possible to arrange such that the coil is wound with pitch wire diameter ratio of 1 at the end of the tip which experiences the heaviest wear, whereas, in the remainder portion of the coil, the pitch wire diameter ratio is greater.

In the described embodiment, the fixing of the core part 1 to the main part 2 can be done in various ways. According to one method, the core part 1 is placed in a bore formed in the main part 2 and a hard mandrel, e.g., a steel wire, which has an outside diameter equal to the inside diameter of the passage bore suitable for delivering electric current to the welding wire 4, is placed in the bore of the core part 1 which has the form of a coil. Then, the blank material of the tip main part 2 is pressed with impacts at its outer peripheral surface by means of dies which has a conical forming portion so that the blank material is plastically deformed leaving the wire passage bore 3 of a diameter suitable for supplying welding current to the welding wire 4, while attaining a close and tight pressure contact between the core part 1 and the main part 2. This type of mechanical processing will be referred to as "swaging" hereinafter. The fixing of the core part to the main part also can be conducted in various other ways. For instance, other types of mechanical bonding, e.g., screwing or caulking of the coil to the core formed in the main part, chemical bonding, and metallurgical bonding can suitably be adopted. FIG. 2A shows the cross-section of the welding contact tip after the swaging.

The coil constituting the core part may extend only over the end region of the tip, e.g., 20 mm, as shown in FIG. 2B, or may extend over the entire length of the tip as shown in FIG. 2C.

When the welding contact tip is formed by swaging, the material of the tip main part 2 plastically flows to fill any space formed between adjacent turns of the coil constituting the core part 1 as well be seen from FIG. 2B, so that the core part 1 is firmly held by the main part 2. In consequence, any tendency for the core part 1 to move axially during feeding of the welding wire 4 is avoided and the generation of heat at the boundary between the core part 1 and the main part 2 can be reduced to a negligible level.

In order to attain a higher strength of mechanical bond between the core part 1 and the main part 2, it is effective to bend the end extremity of the main part 2 radially inward. It is also effective to provide irregularities by, for example, roughening or knurling, on one or both of the inner surface of the main part 2 and the outer surface of the core part 1.

Figure 3A:
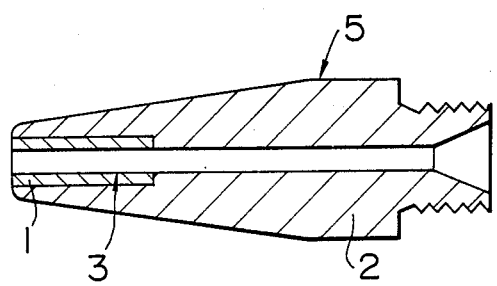
Figure 3B:
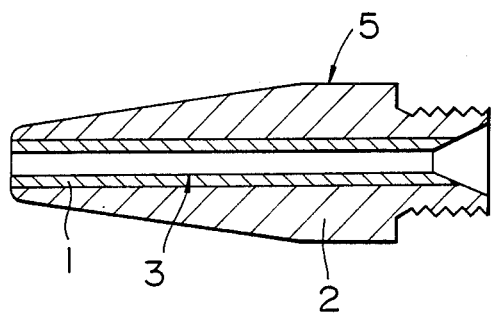

In general, only a thin annular region around the inner peripheral surface defining the wire passage bore 3 contributes to the guiding of the welding wire 4 and to the supply of the welding current to the welding wire 4. According to the invention, this thin annular region is constructed as the core part 1 which is made from a hard conductive metallic material independently from the remainder portion which constitutes the main part 2 made from an inexpensive and highly workable material such as copper, a copper alloy, aluminum or an aluminum alloy. It is thus possible to obtain a welding contact tip which is easy to produce and which is inexpensive as compared with known tips, while ensuring high durability which well compares with that of the known tips. FIGS. 3A and 3B show another embodiment of the welding contact tip of the present invention. This embodiment features that the core part 1 is formed from a pipe-shaped blank material or by boring a solid rod. The pipe or the solid rod with a bore drilled therein may extend only over the end region, e.g., 20 mm in this embodiment, as shown in FIG. 3A or over the entire length of the tip as shown in FIG. 3B. The wall thickness of the core part, regardless of whether it is shaped from a pipe blank or from a solid rod by boring, preferably ranges between 0.1 and 2 mm also in this case.

The fixing of the core part 1 to the main part 2 can be done by the same methods as those explained in connection with the first embodiment, and advantages produced by the first embodiment are also confirmed with the embodiment shown in FIGS. 3A and 3B.

Figure 4A:
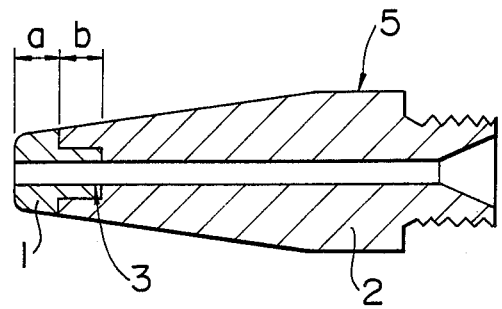
Figure 4B:
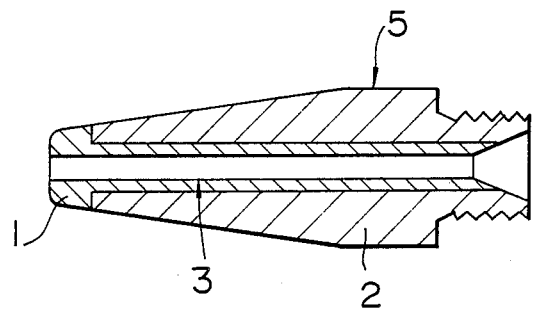

FIGS. 4A and 4B show still another embodiment of the welding contact tip in accordance with the present invention. This embodiment features that the core part 1 has a T-shaped section taken along the axis thereof. Thus, the core part 1 has an end portion which projects from the end extremity of the main part 2 and having an outside diameter substantially equal to that of the main part, and a stem portion which is received in the bore formed in the main part 2. In the arrangement shown in FIG. 4A, the end portion of the core part 1 has an axial length a which preferably ranges between 2 and 15 mm, though the length a exceeding 1 mm provides an appreciable effect. On the other hand, the length b of the stem portion should be not smaller than 1 mm in order to obtain an appreciable effect in mechanical bonding between the core part 1 and the main part 2.

In the arrangement shown in FIG. 4B, the stem portion of the core part 1 extends substantially over the entire length of the bore formed in the main part 2.

The mechanical bonding between the core part 1 and the main part 2 can be attained by the same methods as those explained before in connection with the preceding embodiments, and the advantages offered by the preceding embodiments are also derived from the embodiment shown in FIGS. 4A and 4B.

The embodiment shown in FIGS. 4A and 4B produces an additional advantage in that, since the extreme end of the tip is covered by the hard conductive metal, the tendency for the tip to be contaminated by welding spatter is remarkably suppressed.

The core part 1 may be formed by forging. In such a case, the core part is work-hardened to exhibit higher hardness so as to ensure a longer life of the tip 5 as compared with known tips.

What is claimed is:

1. A welding contact tip having a central through bore service as a passage for a consumable electrode comprising a core part contactable with said consumable electrode and a main part supporting said core part, said main part being made of a material selected from the group consisting of copper, a copper alloy, aluminum and an aluminum alloy, while said core part is made of a phosphor bronze having a phosphorus content ranging between 0.005 and 3.0%, which is a conductive material having a hardness higher than that of the material of said main part.

2. A welding contact tip according to claim 1, wherein said core part is formed as a coil.

3. A welding contact tip according to claim 1, wherein irregularities are formed on one or both of the inner peripheral surface of said main part and the outer peripheral surface of said core part.

4. A welding contact tip according to claim 1, wherein the end extremity of said main part is bent radically inward so as to form a structure preventing said core part from being axially removable from said main part.

5. A welding contact tip according to claim 1, wherein said core part has a first portion fitted in said main part and a second portion having an outside diameter substantially the same as that of the forward end of said main part so that said core part has a substantially T-like sectional shape.

6. A welding contact tip according to claim 1, wherein said core part extends substantially over the entire length of said main part.

7. A welding contact tip according to claim 1, wherein said core part extends from the end extremity of said main part over a length which is not smaller than 2 mm.

* * * * *